(12) United States Patent
Ben-Yaish et al.

(10) Patent No.: US 10,394,051 B2
(45) Date of Patent: Aug. 27, 2019

(54) TORIC OPHTHALMIC LENS HAVING EXTENDED DEPTH OF FOCUS

(75) Inventors: Shai Ben-Yaish, Nechalim (IL); Alex Zlotnik, Ashdod (IL); Ido Raveh, Neve Yarak (IL); Ofer Limon, Kfar-Saba (IL); Oren Yehezkel, Ramt-Gan (IL); Karen Lahav-Yacouel, Petach Tikva (IL); Michael Goldstein, Herzliya (IL); Zeev Zalevsky, Rosh HaAyin (IL)

(73) Assignee: Brien Holden Vision Institute, Kensington, New South Wales (AU)

( * ) Notice: Subject to any disclaimer, the term of this patent is extended or adjusted under 35 U.S.C. 154(b) by 0 days.

(21) Appl. No.: 13/997,533

(22) PCT Filed: Dec. 20, 2011

(86) PCT No.: PCT/IL2011/050069
§ 371 (c)(1),
(2), (4) Date: Sep. 11, 2013

(87) PCT Pub. No.: WO2012/085917
PCT Pub. Date: Jun. 28, 2012

(65) Prior Publication Data
US 2014/0022508 A1    Jan. 23, 2014

Related U.S. Application Data

(60) Provisional application No. 61/426,712, filed on Dec. 23, 2010.

(51) Int. Cl.
*G02C 7/02* (2006.01)
*G02C 7/04* (2006.01)

(52) U.S. Cl.
CPC ............. *G02C 7/02* (2013.01); *G02C 7/04* (2013.01); *G02C 7/042* (2013.01); *G02C 2202/02* (2013.01)

(58) Field of Classification Search
CPC . G02C 7/02; G02C 7/04; G02C 7/042; G02C 2202/02; G02C 7/022
USPC .... 623/6.23, 6.24, 6.27; 351/159.21, 38, 54, 351/72
See application file for complete search history.

(56) References Cited

U.S. PATENT DOCUMENTS

| | | | |
|---|---|---|---|
| 5,570,143 A * | 10/1996 | Newman | 351/159.52 |
| 7,365,917 B2 | 4/2008 | Zalevsky | |
| 9,329,407 B2 | 5/2016 | Cathey, Jr. et al. | |
| 2004/0230299 A1 | 11/2004 | Simpson | |
| 2006/0034003 A1* | 2/2006 | Zalevsky | A61F 2/16 359/738 |
| 2009/0210054 A1* | 8/2009 | Weeber | A61F 2/1613 623/6.11 |
| 2010/0016965 A1* | 1/2010 | Hong et al. | 623/6.34 |
| 2011/0166652 A1* | 7/2011 | Bogaert | A61F 2/1654 623/6.27 |

(Continued)

FOREIGN PATENT DOCUMENTS

| | | |
|---|---|---|
| CA | 2096706 | 11/1994 |
| WO | 9303409 A1 | 2/1993 |

*Primary Examiner* — Ricky Mack
*Assistant Examiner* — Gary O'Neill
(74) *Attorney, Agent, or Firm* — Jones Day

(57) ABSTRACT

An ophthalmic lens is presented. The lens includes a toric optical zone and a phase-affecting, non-diffractive optical element for extending depth of focus of imaging.

21 Claims, 4 Drawing Sheets

(56) References Cited

U.S. PATENT DOCUMENTS

2011/0205486 A1* 8/2011 Zhao ..................... G02C 7/04
351/159.21

* cited by examiner

TORIC OPHTHALMIC LENS HAVING EXTENDED DEPTH OF FOCUS

FIELD OF INVENTION

The present invention relates to lenses for ophthalmic applications and, more particularly, to ophthalmic toric lenses.

BACKGROUND

Ocular astigmatism (referred to hereinafter simply as "astigmatism") is a phenomenon associated with variation of the eye's optical power as a function of meridian. For example, one eye may require a first dioptric correction of one diopter along one meridian, and a second, different correction or no correction along another meridian. The astigmatism typically arises due to asymmetry of the cornea or tilting of the crystal lens in the eye. When an eye requires a non-varying maximum correction along a first meridian and a non-varying minimum correction along a second meridian, the meridians being separated by an angle of 90 degrees, this is called "regular astigmatism." When the angle is not 90 degrees, or the necessary correction varies along a meridian or there are more than two meridians, this is called "irregular astigmatism."

Ophthalmic lenses, for example contact lenses and intraocular lenses (IOLs), for correcting refractive abnormalities of the eye associated with astigmatism typically have a toric optical zone (also referred to herein simply as a toric zone). Such lenses are commonly referred to in the industry as "tonic lenses." The toric optical zone provides cylindrical correction to compensate for the astigmatism. Since astigmatism that requires vision correction is usually associated with other refractive abnormalities, such as myopia (nearsightedness) or hypermetropia (farsightedness), toric lenses are generally prescribed also with a spherical correction to correct myopic astigmatism or hypermetropic astigmatism. The toric surface may be formed on either the posterior lens surface (back surface toric lens) or in the anterior lens surface (front surface toric lens).

Toric contact lenses have several complications associated therewith. Whereas conventional spherical contact lenses may freely rotate on the eye, toric contact lenses have some type of ballast to inhibit rotation of the lens on the eye so that the cylindrical axis of the toric optical zone remains generally aligned with the eye's astigmatic axis. For example, to provide such ballasting, one or more sections of the lens periphery may be thicker (or thinner) than other sections. Examples of ballasts may include prism ballasts and peri ballasts.

Toric contact lenses are manufactured with a selected relationship (commonly referred as angular offset or simply offset) between the cylindrical axis of the toric optical zone and the orientation of the ballast to correct astigmatism at various angular orientations. This relationship is expressed as the number of degrees rotation that the cylindrical axis is offset from the orientation axis of the ballast feature(s). Accordingly, toric contact lens prescriptions specify this offset, with toric lenses generally being offered by contact lens manufacturers in 5-degree or 10-degree increments ranging from 5 degrees (or 10 degrees) to 180 degrees.

In summary, a prescription for such toric contact lenses will typically specify spherical correction (i.e., dioptric power), cylindrical correction (i.e., dioptric power) and axis offset (i.e., angular rotation) to define the optical correction.

It will be appreciated that toric contact lenses are much more complicated for a practitioner to fit than spherical contact lenses which have only a spherical correction. Although toric lenses include a ballast to inhibit rotation, a toric contact lens may still have too much rotational instability for some patients' eyes. Furthermore, if the cylindrical axis of the lens is misaligned with the eye's axis of astigmatism, the astigmatism is not fully corrected, and, in fact, vision may be further impaired. Many astigmatic patients cannot be fitted for contact lenses for these reasons.

A further disadvantage of toric contact lenses is that a manufacturer has to make, inventory, and supply a very large number of lens units. In comparison with spherical contact lenses which include only a spherical optical correction, for toric contact lenses, the manufacturer must make, for each spherical correction, a range of cylindrical corrections, with each being offered at a range of axis offsets from 5 degrees (or 10 degrees) to 180 degrees. From a practitioner standpoint, the practitioner either needs to maintain a large inventory of toric contact lenses in his/her trial fitting sets for trial testing on a patient in his/her office, or trial fit a patient with a lens that does not have the correct optical correction. Since toric contact lenses are more expensive to manufacture and inventory, their cost is substantially higher than spherical contact lenses.

Intraocular lenses (IOLs) replace the natural crystalline lens of a patient. If the patient is myopic, an IOL including myopic correction may be implanted. If the patient has astigmatism, the ophthalmic professional may employ a toric IOL, including a toric zone having a cylindrical correction, to compensate for the astigmatism.

During surgical implantation of a toric IOL, the cylindrical axis of the toric IOL must be aligned with the eye's axis of astigmatism, otherwise the astigmatism is not fully corrected; in fact, vision may be impaired more than if a spherical IOL had been used. However, even if the IOL is correctly aligned in the eye to correct the astigmatism during the surgical procedure, it is not uncommon for the lens to rotate during the post surgical healing phase, resulting in angular misalignment. For this reason, many ophthalmic professionals may be hesitant to implant a toric IOL for risk of deteriorating vision quality rather than improving it as intended.

Surgeons may only try to correct 1.25 D (diopters) of astigmatism or greater because the error in the system may not allow a benefit in vision to be demonstrated for astigmatism lower than 1.25 D. For patients having less than 1.25 D of astigmatism, while the patient could benefit visually from correction, the lack of accuracy and precision in aligning the toric lens in surgery may preclude surgeons from attempting to correct these lower amounts.

GENERAL DESCRIPTION

Aspects of the present invention are directed to methods and apparatus for extending the depth of focus of ophthalmic lenses, including, for example, glasses for spectacles, contact lenses, intraocular lenses, or other lenses used around or inserted surgically into the eye, and thereby mitigating the effects of astigmatism in the eye. In particular, aspects and embodiments provide for an extended depth of focus optical element that is co-located with or incorporated into a toric lens to mitigate affects of astigmatism in the eye.

According to one embodiment, an ophthalmic lens for extending depth of focus of an ocular system, comprises a toric zone and a phase-affecting, non-diffractive optical element optically coupled to the toric optical zone. In one example, the optical element is a phase-affecting-only element. In another example, the toric optical zone and the element are disposed on a common anterior and/or posterior surface of the lens. In one example, the lens is a contact lens.

In one example, the optical element comprises a modulated surface relief on the lens. The modulation amplitude may be, for example, less than 1500 nm, or less than 550 nm for at least a portion of the lens. In another example, the phase-affecting, non-diffractive optical element comprises a first material having a first index of refraction and a second material having a second index of refraction, wherein the first index of refraction and the second index of refraction are different than one another. At least some of the first material may be embedded within the second material. In one example, portions of the optical element comprising the first material form a modulated surface relief on the lens, and the second material is disposed within the modulations. In another example, the optical surfaces of the lens are non-modulated.

According to one example of the lens, the meridian of maximum optical power and the meridian of minimum optical power are offset from one another by 90 degrees. In another example, the phase-affecting, non-diffractive optical element comprises materials having different indices of refraction. In one example, the phase-affecting, non-diffractive optical element contains has a modulation period of less than or equal to 1000 wavelengths of a visible wavelength of light. The visible wavelength of light may be in a range of about 380 nm to 750 nm, for example, 550 nm. In one example, the phase-affecting, non-diffractive optical element is disposed on a surface of the toric zone. In another example, the phase-affecting, non-diffractive optical element is integrally formed with the toric zone. The phase-affecting, non-diffractive optical element may be embedded in the lens.

It will be appreciated that embodiments of the toric lens according to aspects of the present invention allow the number of lens units inventoried to be reduced. As an example, Bausch & Lomb Incorporated sells toric lenses under the SofLens 66 trademark. Consider toric lenses having a cylindrical correction of −1.5; these lenses are offered with spherical corrections in 0.25 diopter increments from −9 D to +6 D, and 0.50 diopter increments from +6 D to +9 D. And for each spherical and cylindrical correction, the lenses are offered in axes offsets of 10 degree increments from 10 to 180 degrees. This amounts to 990 different lens units just for the −1.5 cylindrical correction. In contrast, a toric lens which has an increased depth of field according to aspects of this invention provides an increased range of rotational error (i.e., rotational misalignment of the cylindrical axis relative to the astigmatic axis as measured about the optical axis) for which the lens is capable of mitigating astigmatism. It will be appreciated that such insensitivity to rotation would allow a product line to have lenses of a given cylindrical correction with fewer offsets while still providing correction over a full range of offsets (i.e., 0-180 degrees of offset). It will also be appreciated that an increased depth of field will allow increased certainty of astigmatism mitigation without risk of angular misalignment further impairing vision. For example, the certainty will increase the willingness of a practitioner to correct relatively small amounts of astigmatism.

The term "toric surface" as used herein refers to an optical surface having a combination of spherical curvature and cylindrical curvature.

The term "toric lens" as used herein includes lenses having a toric zone comprising a toric surface as well as other lenses having optical power suitable for forming an astigmatic wavefront from a planar wave input. For example, the astigmatic wavefront may be achieved using diffraction or refraction (e.g., using a variation in index of refraction or variation in curvature).

The term "phase-affecting" means having features that modify the phase of regions of wavefront while leaving multiple, other regions of the wavefront unmodified (e.g., the regions may be circles, annular rings, ellipses or elliptical annular rings).

The term "non-diffractive" means operating such that the output wavefront is substantially projected into a single diffractive order. It will be appreciated that a non-diffractive element is neither diffractive nor, because it provides no optical power, is it refractive. It should be understood that in such non-diffractive optical element, features of a pattern defining the phase modifying regions have a lateral dimension of the order of the wavelength for which the lens is to be used or larger; and the non-refractive optical element having no optical power does not introduce any convergence or divergence in the light propagation.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

The present invention is directed towards methods and apparatus for extending the depth of focus of toric ophthalmic lenses, including, for example, glasses for spectacles, contact lenses, intraocular lenses, or other lenses used proximate to (i.e., operatively optically coupled to) or inserted into the eye, and mitigating effects of astigmatism in the eye.

According to one embodiment, a phase-adjusting, non-diffractive optical element is associated with a toric lens and used to modify the phase of the optical wavefront passing though the toric lens, thereby achieving an extended depth of focus, as discussed further below. The optical element is configured as a phase-affecting, non-diffractive optical element that, together with the lens, defines a pattern formed by spaced-apart substantially optically transparent features of different phase-altering properties that modify the wavefront of the lens so as to provide an all-optical effect of extending the depth of focus. The term "all-optical" as used herein signifies that a need for electronic image processing is eliminated or at least substantially reduced.

Figure 1A:
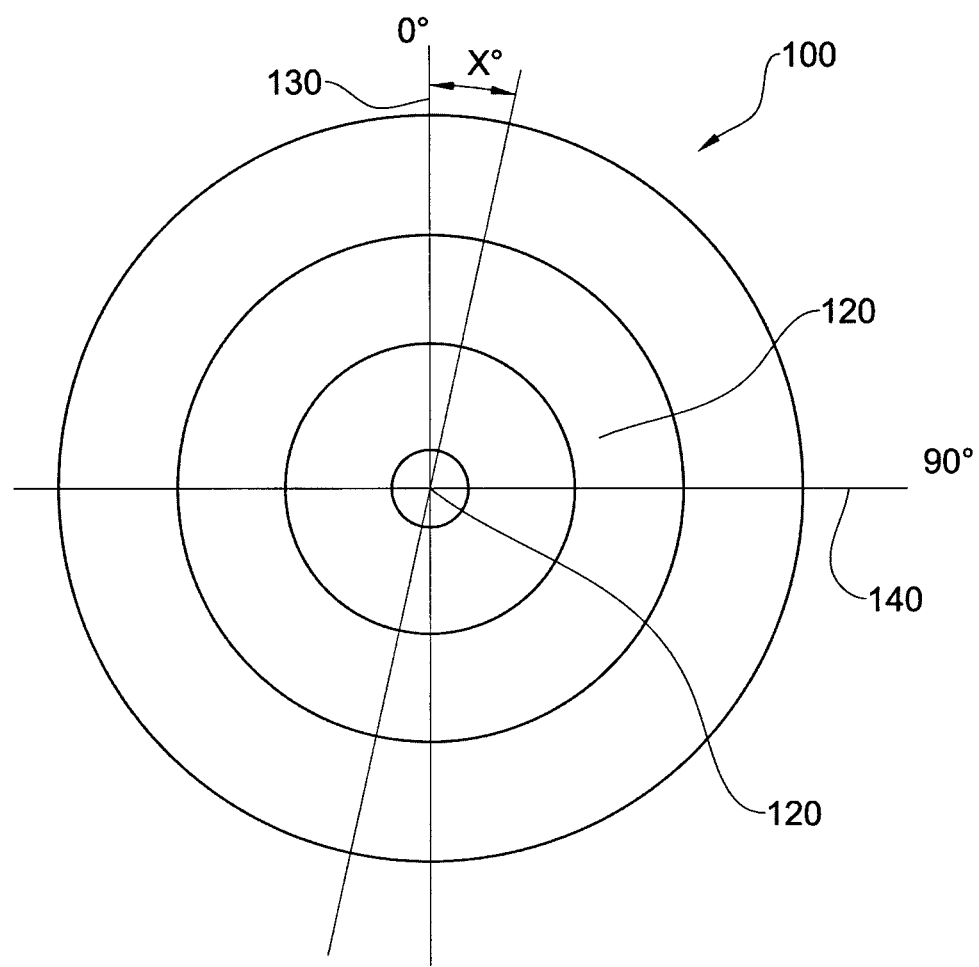
FIG. 1A is a schematic plan view of an example of an embodiment of an ophthalmic lens comprising a toric zone, and a phase-affecting, non-diffractive optical element according to aspects of the present invention.
Figure 1B:
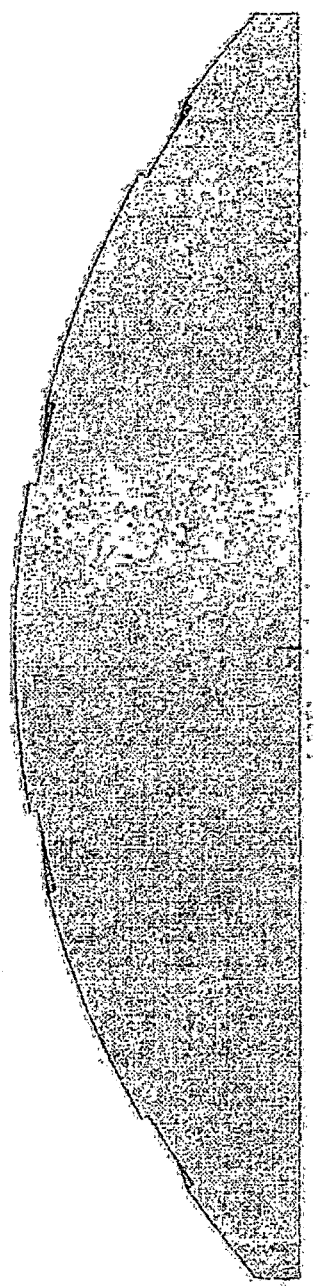
FIG. 1B is a first cross-sectional diagram of the ophthalmic lens of FIG. 1A.
Figure 1C:
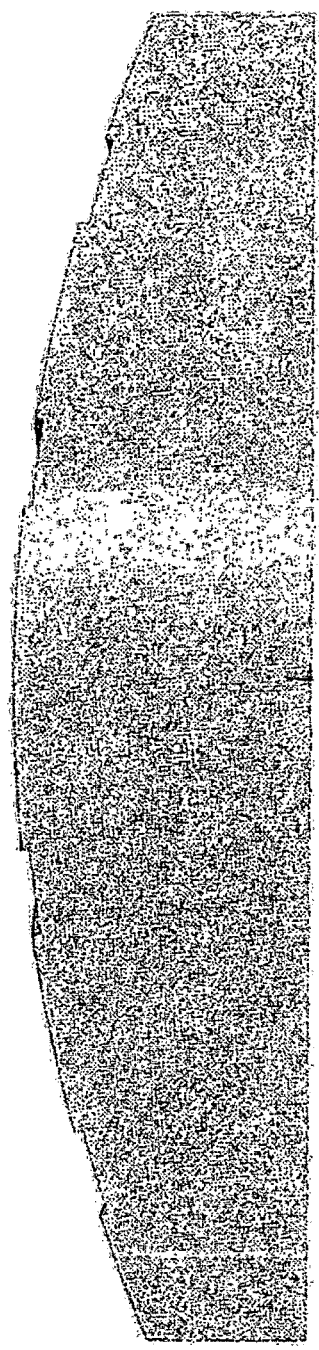
FIG. 1C is a second cross-sectional diagram of the ophthalmic lens of FIG. 1A.

Referring to FIG. 1A there is illustrated an example of an ophthalmic toric lens 100 comprising a toric optic and a phase-affecting, non-diffractive optical element. The combination is referred to herein as an extended depth of focus (EDOF) lens. In the example illustrated in FIG. 1A, the EDOF optical element comprises a plurality of concentric regions 120 having different physical thicknesses (i.e., the phase-affecting, non-diffractive optical element forms a modulated surface relief), as discussed further below. Axes 130 and 140 represent the meridians of the toric lens having minimum and maximum dioptric power, respectively. In one example, the two meridians are offset from one another by 90 degrees; however, in other examples, the offset between the two meridians may be an angle other than 90 degrees. The angle X represents rotation of the cylinder axis 130, as will be discussed in more detail below. FIGS. 1B and 1C show cutaway, cross-sectional views of lens 100 along axes 130 and 140, respectively.

The phase-affecting, non-diffractive optical element may be configured as a phase-only element or as a phase and amplitude affecting element. The phase-affecting, non-diffractive optical element 120 is configured as a phase-affecting mask (for example, a binary mask) of spatially low frequency transitions that modifies a wavefront passing through the lens to provide extended depth of focus. This may be achieved by designing the phase-affecting, non-diffractive optical element so as to define a pattern of spaced apart, optically transparent regions 120 that have different refractive indices and/or different physical thicknesses compared to other regions of the phase-affecting, non-diffractive optical element and thus affect the phase of the light passing therethrough. In order to extend the depth of focus of the lens, the phase differences caused by the region(s) 120 are designed to create a desired constructive/destructive interference pattern of the light at the image caustic of the lens. The phase differences caused by the region(s) 120 are typically small, for example, less than or equal to $\pi$.

In one example, the phase-affecting, non-diffractive optical element contains only a very limited number of regions (period of about 1,000 wavelengths of visible light, e.g., light having a 550 nm wavelength). Thus, in contrast to diffractive optical elements, the phase-affecting, non-diffractive optical element has the spatial feature(s) of very low frequency. As a result, the phase-adjusting element is not diffractive to visible light passing therethrough; and substantially all the light remains in a single order, typically the zeroth order. Accordingly, the phase-adjusting element may be termed "non-diffractive" to visible light. It will be appreciated that the phase-affecting, non-diffractive optical element allows for obtaining energy-efficient extension of the depth of field, since not only is all the energy passed through the element itself (it is substantially phase-affecting only) but also all of the energy is projected at the proper transversal and longitudinal region of the image caustic (in contrast to a diffractive element which has energy split either between multiple longitudinal focal planes or between traversal diffraction orders). It is to be appreciated that although the phase-affecting, non-diffractive element will have no optical power, the associated toric optic will have optical power. It will be appreciated that, in the illustrated embodiment, the phase-affecting, non-diffractive optical element can be produced as a thin phase layer constructed in a low-cost lithographic technique or stamping with the thickness of the phase layer being on the order of only one wavelength (e.g., around 0.5 micron in the case of visible light).

The phase-adjusting, non-diffractive optical element may be a separate element attached to the toric optic or located proximate to the toric optic so as to be operatively optically coupled thereto, or may be implemented integral with the toric optic, for example as a surface relief on the lens. Thus, the EDOF optical element may be located adjacent to, attached to the surface of, or incorporated within the lens. As discussed above, in one example, the EDOF optical element is implemented as a surface relief on the lens, namely, a pattern of spaced-apart regions of variable lens thickness. In this example, the EDOF optical element may be formed on the same lens surface as the toric zone 110 or on the opposite lens surface as the toric zone. The EDOF optical element may also be implemented as a pattern of spaced-apart lens regions made of materials with different refractive indices $\eta_1$ and $\eta_2$. In the case of different refractive index materials, an optically transparent material of a refractive index different from that of the toric optic may be coated on selected spaced-apart regions of the lens surface or embedded within the lens. It will be appreciated that, in such an embodiment, the surfaces of the lens may be non-modulated (e.g., without surface relief to form the phase-affecting non-diffractive element).

Still referring to FIG. 1A, the phase-affecting, non-diffractive optical element may be configured in accordance with the parameters of the optic, for example, its aperture size and optionally also the optical power distribution and/or focal length. Examples of arrangements and configurations of imaging systems incorporating embodiments of the phase-affecting, non-diffractive optical element, as well as methods and techniques for determining the arrangement and/or configuration of the EDOF optical element are disclosed in U.S. Pat. No. 7,365,917 entitled "OPTICAL METHOD AND SYSTEM FOR EXTENDED DEPTH OF FOCUS," which is attached hereto as Appendix A and herein incorporated by reference in its entirety.

Considering ophthalmic applications, wherein the phase-affecting, non-diffractive optical element with its range of depth of focus is used in conjunction with an ophthalmic optic, such as a contact lens, the range of depth of focus may be translated into diopter range. The EDOF lens generates a diopter range within which the lens provides acceptable performance.

For most people, the usable aperture of the eye can be defined by a relatively narrow range of values and therefore, the EDOF lens can be designed for a great number of patients. For example, the diameter of the eye lens typically varies from about 2 millimeters (mm) up to about 6-7 mm, depending on the lighting conditions and age of the individual wearing the lens. In one example, an EDOF lens is configured to allow a depth of focus equivalent to 2-3 diopters for an effective aperture of 2-3 mm. The design of the EDOF lens may also take into account the optical power of the lens with which the element is associated, as discussed in above-referenced U.S. Pat. No. 7,365,917. The additional diopter range and extended depth of focus provided by the phase-affecting, non-diffractive element in combination with the toric optic 100 may be used to mitigate the effects of astigmatism in the eye, and/or to provide more robust toric lens performance, as discussed further below.

Figure 2:
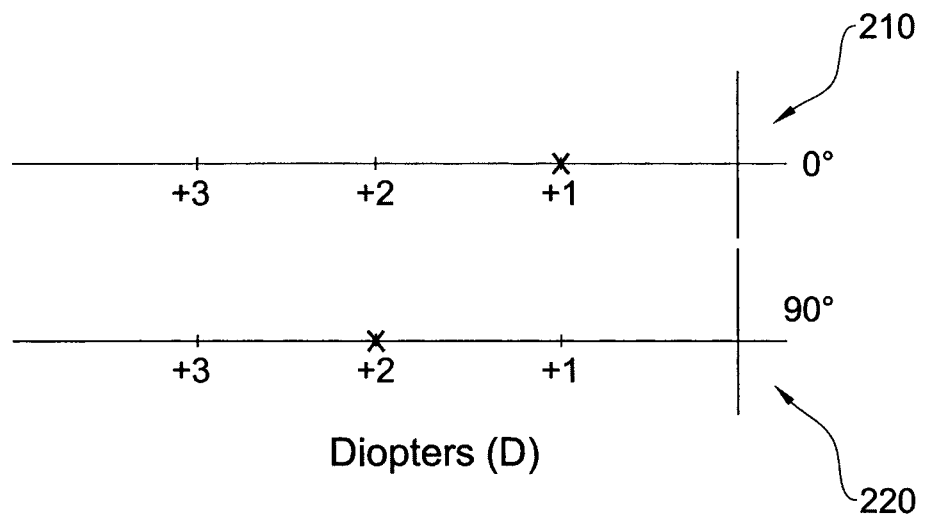
FIG. 2 is a graphical representation of dioptric error of an example astigmatic eye for two meridians in the eye.

FIG. 2 is a graphical representation of dioptric error of an example astigmatic eye for two meridians in the eye. The dioptric error is shown for meridians 210 and 220 which have maximum and minimum dioptric error, respectively. In the example illustrated in FIG. 2, the meridians are rotationally separated from one another by 90 degrees; however, as discussed above, it is to be appreciated that the separation between the eye's maximum and minimum dioptric errors need not be 90 degrees, as is the case in patients with irregular astigmatism. In the illustrated example, the eye has 1 D of myopia (indicated as 0°) and the eye has +1 D of cylinder (indicated as 90°).

Figure 3:
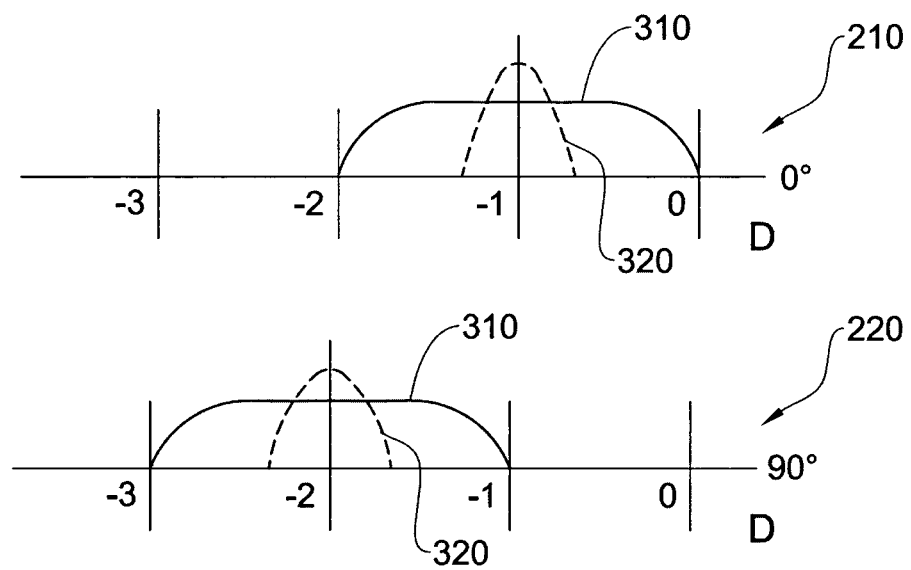
FIG. 3 is a graphical representation of image quality through depths of focus of the lens of FIG. 1A in two meridians separated from one another by 90 degrees, with depths of focus of a conventional toric lens (excluding the element) shown in phantom.

Referring to FIG. 3 there is illustrated a graphical representation of depths of focus of the lens of FIG. 1A for meridians 210, 220 separated from one another by 90 degrees. In FIG. 3, trace 310 represents the depth of focus of the lens of FIG. 1A including both the toric optic and the phase affecting, non-diffractive optical element 120, and trace 320 represents the depth of focus of a conventional toric lens (i.e., excluding the phase-affecting, non-diffractive element). As can be seen with reference to FIG. 3, the EDOF optical element broadens the depth of field range of lens 100 as discussed above. Therefore, lens 100 may be used to correct for vision defects over a wider diopter range, resulting in a need for fewer different lenses (i.e., lens SKUs) being required to correct different amounts of astigmatism, which may provide cost and inventory benefits (i.e., an EDOF lens having a particular offset could correct astigmatism over a greater range of diopter values than a conventional lens). It will be appreciated, as illustrated in FIG. 3, that the EDOF lens increases depth of field and decreases peak visual performance relative to a conventional toric lens.

Figure 4:
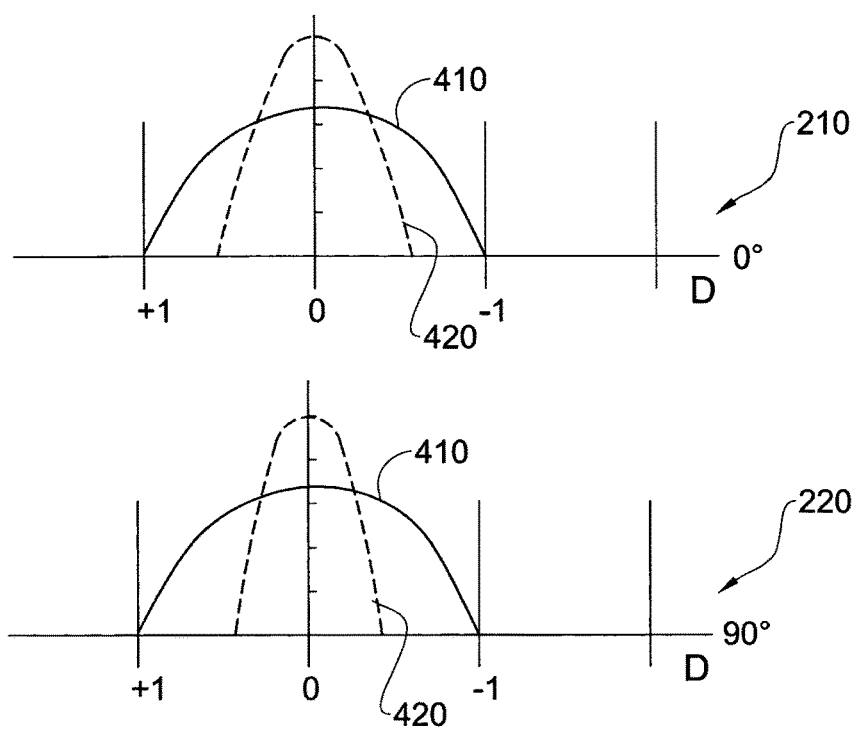
FIG. 4 is a graphical representation of visual performance through depths of focus of an eye optical system along the astigmatic axis and an axis at astigmatic axis plus 90 degrees, when the lens of FIG. 1A is applied to the eye of FIG. 2, and the lens is ideally rotationally positioned relative to the astigmatic axis.

FIG. 4 is graphical representation of the depths of focus of an eye optical system when the lens of FIG. 1A is applied to the eye of FIG. 2 and the lens is ideally rotationally positioned and provides an ideal amount of cylindrical power. In FIG. 4, trace 410 represents the depth of focus of the lens of FIG. 1A including both the toric optic 110 and the phase-affecting, non-diffractive optical element 120 when on the eye, and trace 420 represents the depth of focus of a conventional toric lens (i.e., excluding the phase-affecting, non-diffractive element). Visual performance is measured on the vertical axis in FIG. 4. No scale for visual performance is given because FIG. 4 is not intended to illustrate an absolute measurement or value of visual performance, but rather to illustrate that the lens 100 provides more robust performance than a conventional toric lens that lacks the phase-affecting, non-diffractive optical element 120. The lens 100 extends relative to a conventional lens, the depth of focus of the optical system, and mitigates the effects of astigmatism in the eye. While both the lens 100 incorporating the phase-affecting, non-diffractive optical element and the conventional toric lens correct cylinder errors in the ideal situation, as shown below, the phase-affecting, non-diffractive optical element offers advantages in non-ideal situations where the lens becomes rotated relative to the cylindrical axis of an eye (i.e., where there is rotational error).

Figure 5:
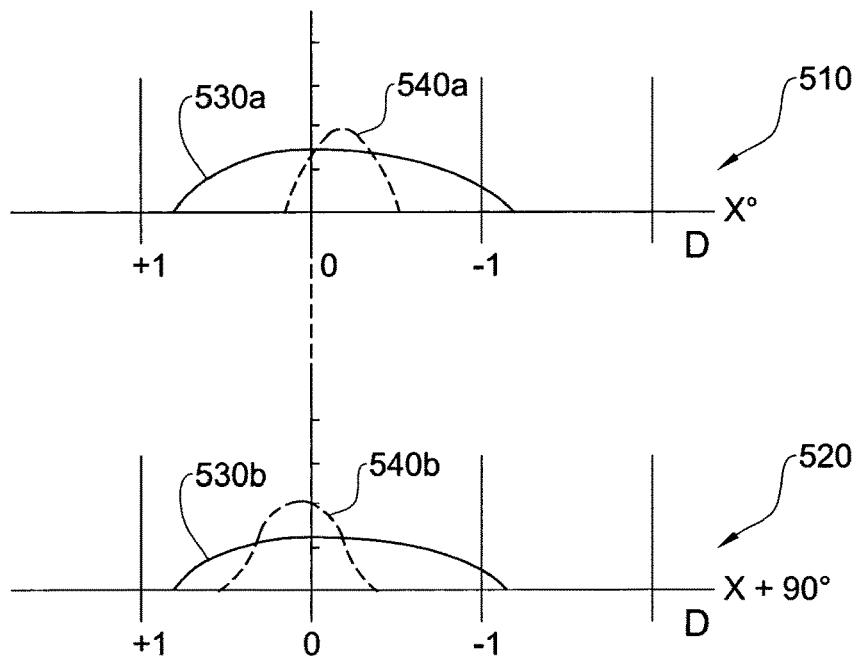
FIG. 5 is a graphical representation of anticipated visual performance through depths of focus of an eye optical system along the astigmatic axis and an axis at astigmatic axis plus 90 degrees, when the lens of FIG. 1A is rotated X degrees away from ideal rotational positioning.

FIG. 5 is a graphical representation of anticipated visual performance through depths of focus of an eye optical system along the astigmatic axis and an axis at astigmatic axis plus 90 degrees, when the lens of FIG. 1A is rotated X degrees away from ideal rotational positioning. The scale of the vertical axis in FIG. 5 is similar to that in FIG. 4 to illustrate comparative visual performance. As can be seen with reference to FIG. 5, rotational errors decrease the ability of both the conventional and inventive toric lenses to correct astigmatism of the eye. Rotational error has an impact on both the spherical power meridian 510 and the cylinder power meridian 520, resulting in a decrease in visual performance (i.e., the amplitude of the visual performance curves is decreased). However, for the conventional lens, due to a shift of the performance curves 540*a* and 540*b* for the two meridians, in opposite directions relative to the 0 D, if the rotation (X degrees) is sufficiently large, the conventional lens may be ineffective at correcting astigmatism of the eye (i.e., the visual performance at 0 D is too low). In contrast, the lens comprising the EDOF optical element is significantly more robust with respect to rotational error. As illustrated in FIG. 5, the extended depth of focus of the lens 100 (represented by traces 530a and 530b) provides acceptable visual performance at 0 D, whereas the same degree of rotational error causes the conventional lens to fail. Rotation results in decreased amplitude of performance of both lenses relative to FIG. 4; however the extended depth of focus allows there to be sufficient visual performance in both meridians, at a particular distance (i.e., at 0 D). The level of visual performance will depend on the depth of field provided by the lens 100, as well as the degree of rotational error.

Thus, as indicated above embodiments of the lens 100 including the phase-affecting, non-diffractive optical element may allow for reduced toric lens inventory because the extended depth of focus provides cylinder power and spherical power over a greater diopter range than conventional lenses, and a single lens 100 may therefore provide correction for, or mitigation of, vision defects over a wider diopter range. In addition, as illustrated in FIG. 5, because embodiments of the lens 100 are less sensitive to rotational error in the eye than are conventional lenses, a single lens 100 may be sufficient for use with a variety of cylinder axis offsets. Thus, inventory of toric lenses may be reduced. In addition, embodiments of the lens 100 may be more satisfactory to patients because small rotational errors of the lens may not severely impact the patient's visual performance. For example, such rotation errors may arise due to blinking, rubbing or movements of the eye, or due to static causes such as the shape of a wearer's cornea. In addition, the reduced sensitivity of the lens 100 to rotational errors may allow intraocular embodiments of these lenses to be used where ophthalmic professionals may previously have been hesitant to implant a toric intraocular lens for risk of deteriorating vision quality (due to rotational errors of the lens arising due to implantation errors or as a result of the healing process).

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

The invention claimed is:

1. An ophthalmic lens for extending depth of focus of an ocular system, comprising:
   a toric zone;
   a first meridian associated with a first optical power of the ophthalmic lens and a second meridian associated with a second optical power different than the first optical power of the ophthalmic lens; and
   a phase-affecting, non-diffractive optical element optically coupled to the toric zone, the phase-affecting, non-diffractive optical element being non-diffractive for visible wavelengths to project an output wavefront into a single diffractive order,
   the phase-affecting, non-diffractive optical element comprising a modulated pattern of spaced apart optically transparent regions and providing a depth of focus for the first meridian that matches a depth of focus for the second meridian.

2. The ophthalmic lens of claim 1, wherein the phase-affecting, non-diffractive optical element is a phase-affecting-only element.

3. The ophthalmic lens of claim 1, wherein the toric zone and the phase-affecting, non-diffractive optical element are disposed on common anterior and/or posterior surface of the lens.

4. The ophthalmic lens of claim 1, wherein the phase-affecting, non-diffractive optical element comprises a modulated surface relief on the lens.

5. The ophthalmic lens of claim 4, wherein the modulation amplitude is less than 1500 nm for at least a portion of the lens.

6. The ophthalmic lens of claim 5, wherein the modulation amplitude is less than 550 nm for at least a portion of the lens.

7. The ophthalmic lens of claim 1, wherein the lens is a contact lens.

8. The ophthalmic lens of claim 1, wherein the phase-affecting, non-diffractive optical element comprises a first material having a first index of refraction and a second material having a second index of refraction, wherein the first index of refraction and the second index of refraction are different than one another.

9. The ophthalmic lens of claim 8, wherein at least some of the first material is embedded within the second material.

10. The ophthalmic lens of claim 8, wherein portions of the optical element comprising the first material form a modulated surface relief on the lens, and the second material is disposed within modulations of the modulated surface relief.

11. The ophthalmic lens of claim 1, wherein the first meridian is of maximum optical power and the second meridian is of minimum optical power and are offset from one another by 90 degrees.

12. The ophthalmic lens of claim 1, wherein the phase-affecting, non-diffractive optical element comprises materials having different indices of refraction.

13. The ophthalmic lens of claim 1, wherein the phase-affecting, non-diffractive optical element contains has a modulation period of less than or equal to 1000 wavelengths of a visible wavelength of light.

14. The ophthalmic lens of claim 13, wherein the visible wavelength of light is 550 nm.

15. The ophthalmic lens of claim 13, wherein the visible wavelength of light is in a range of 380 nm to 750 nm.

16. The ophthalmic lens of claim 1, wherein the phase-affecting, non-diffractive optical element is disposed on a surface of the toric zone.

17. The ophthalmic lens of claim 1, wherein the phase-affecting, non-diffractive optical element is integrally formed with the toric zone.

18. The ophthalmic lens of claim 17, wherein the optical surfaces of the lens are non-modulated.

19. The ophthalmic lens of claim 1, wherein the phase-affecting, non-diffractive optical element is embedded in the lens.

20. An ophthalmic lens for extending depth of focus of an ocular system, comprising:
   a toric zone;
   a first meridian associated with a first optical power of the ophthalmic lens and a second meridian associated with a second optical power different than the first optical power of the ophthalmic lens; and
   a phase-affecting, non-diffractive optical element optically coupled to the toric zone, the phase-affecting, non-diffractive optical element being non-diffractive for visible wavelengths to project an output wavefront into a single diffractive order, the phase-affecting, non-diffractive optical element comprising a modulated pattern of spaced apart optically transparent regions and providing a depth of focus for the first meridian that matches a depth of focus for the second meridian, the phase-affecting, non-diffractive optical element counteracting a decrease in astigmatism-correction performance of the ophthalmic lens for both the first meridian and the second meridian that would otherwise occur with rotation of the toric zone away from ideal rotational positioning relative to an astigmatic ocular system in an absence of the phase-affecting, non-diffractive optical element.

21. The ophthalmic lens of claim 1, the phase-affecting, non-diffractive optical element having no optical power.

* * * * *